United States Patent [19]

Kudo

[11] Patent Number: 4,630,186
[45] Date of Patent: Dec. 16, 1986

[54] POWER SOURCE CIRCUIT

[75] Inventor: Sinji Kudo, Yokohama, Japan

[73] Assignee: Stanley Electric Co., Ltd., Tokyo, Japan

[21] Appl. No.: 684,668

[22] Filed: Dec. 21, 1984

[51] Int. Cl.[4] .............................................. H02M 3/335
[52] U.S. Cl. ........................................ 363/19; 363/97; 323/289
[58] Field of Search ..................... 363/18–21, 363/97, 131; 323/289

[56] References Cited

U.S. PATENT DOCUMENTS 3,662,249  5/1972  Wijsboom ...................... 323/289 X
4,361,865  11/1982  Shono ................................... 363/19

FOREIGN PATENT DOCUMENTS 0127218  8/1982  Japan ..................................... 363/19

Primary Examiner—Peter S. Wong
Attorney, Agent, or Firm—Weingarten, Schurgin, Gagnebin & Hayes

[57]  ABSTRACT

A switching power source circuit intermittently switches a current at a primary winding of a transformer in accordance with the repeated switching of a bipolar transistor so as to rectify and smooth a voltage induced at a secondary winding of the transformer, thereby obtaining an output voltage. A capacitor is charged by a voltage induced by a feedback winding of the transformer. The base-emitter path of the bipolar transistor is reverse biased by this charge voltage so as to perform high-speed switching, so that a compact transformer and capacitor can be used and the switching power source circuit becomes low in cost.

The application of the reverse bias voltage is performed by a transistor which is turned on when an emitter (grounded through a resistor) voltage of the bipolar transistor is increased to a predetermined level (threshold). A switching period of the bipolar transistor is determined by a period determining circuit consisting of a timing capacitor and a resistor. The timing capacitor is charged to reverse bias the bipolar transistor when the bipolar transistor is turned on. The timing capacitor is discharged when the bipolar transistor is turned off. An auxiliary winding is arranged in the transformer to detect flyback energy, and the ON and OFF times of the bipolar transistor are controlled to stabilize the output voltage even if an output terminal is overloaded.

4 Claims, 3 Drawing Figures

POWER SOURCE CIRCUIT

BACKGROUND OF THE INVENTION

1. Field of the Invention

The present invention relates to a power source circuit and, more particularly, to a switching power source circuit suitable as a power source of a computer or the like.

2. Description of the Prior Art

A typical conventional switching power source circuit is illustrated in FIG. 1. Reference numeral T denotes a transformer. A primary winding $L_1$ of the transformer T receives a voltage from a power source E switched by a switching transistor Q. A voltage is rectified by a secondary winding $L_2$ appears at an output terminal OUT. At the beginning of operation, a current from the power source E flows in a capacitor C" and a feedback winding $L_3$ through a resistor $R_{10}$ to charge the capacitor C". The current from the power source E also flows in the base of the switching transistor Q. A current flows in the primary winding $L_1$ and the collector of the switching transistor Q, thereby turning on this transistor. At the same time, a voltage is induced by the feedback winding $L_3$ to supply a base current to the switching transistor through the capacitor C". In this case, the capacitor C" is charged with polarities opposite to those illustrated in FIG. 1. When the capacitor C" is gradually charged, the base current is decreased, so that the switching transistor Q is turned off. When the switching transistor Q is turned off, a counter voltage is generated by the feedback winding $L_3$ to charge an electrolytic capacitor C through a diode D. When a charge voltage of the electrolytic capacitor C exceeds a predetermined voltage, a reverse bias voltage is supplied to the base of the switching transistor Q. When the switching transistor Q is turned off, a current supplied to the primary winding $L_1$ is cut off. A voltage will not be generated from the feedback winding $L_3$. As a result, the switching transistor Q is completely turned off.

When the capacitor C is discharged through a timing resistor R to release the transistor Q from the OFF state, a current flows in the base of the switching transistor Q through a starting resistor $R_{10}$. The above operation is then repeated. In this manner, continuous oscillation is performed to extract a continuous output at the output terminal OUT. It should be noted that a Zener diode ZD is used as a protective element for the switching transistor Q.

In the conventional power source circuit, since oscillation is performed by utilizing a signal from the feedback winding $L_3$, an oscillation frequency cannot be increased. The sizes of the transformer T and the electrolytic capacitor C cannot be reduced, and therefore the power source device is large and high in cost. In addition to these disadvantages, the efficiency of the device is degraded (in general, about 70%), and a load response time is long. Furthermore, when a voltage from the power source E is decreased or the output terminal OUT is overloaded, a voltage at the output terminal OUT is lower than the predetermined voltage. A load (e.g., a computer) is adversely affected. An oscillation period of the switching transistor Q is determined by a time constant of an entire feedback circuit including an inductance of the feedback winding $L_3$. Therefore, the oscillation period cannot be finely adjusted, resulting in inconvenience.

SUMMARY OF THE INVENTION

It is an object of the present invention to provide a low-cost power source circuit wherein a current at a primary winding of a transformer is intermittently supplied upon a switching operation of a high-speed bipolar transistor having an emitter grounded through a current detecting resistor, and a voltage induced at a secondary winding of the transformer is rectified and smoothed to produce an output voltage, so that a compact transformer and capacitor can be used and the overall circuit becomes low in cost. The capacitor is charged by a voltage induced by a feedback winding of the transformer. When an emitter voltage of the bipolar transistor increased and the charge voltage on the capacitor reaches a predetermined level (threshold), the voltage on the capacitor is applied as a reverse bias voltage in a base-emitter path of the bipolar transistor through the transistor. Carriers left in the base of the transistor are rapidly emitted to perform high-speed switching of the bipolar transistor. The power source circuit has a period determining circuit. This period determining circuit comprises a series circuit of a diode and a resistor which is connected as a discharge path of the reverse bias capacitor between the base and emitter of the bipolar transistor. Alternatively, the period determining circuit can comprise a series circuit of a resistor and a timing capacitor which is connected between ground and the other end or a central tap of the feedback winding whose one end is connected to the base of the bipolar transistor.

In addition to the turn-off circuit for applying the reverse bias voltage to the bipolar transistor to turn it off and the period determining circuit for determining a switching period, the power source circuit also comprises a voltage correction circuit for detecting flyback energy by an auxiliary winding of the transformer to adjust the threshold of the turn-off circuit and the charge voltage of the timing capacitor so as to change an ON time of the bipolar transistor, thereby stabilizing the output voltage when a power source voltage is decreased or the output terminal is overloaded.

The power source voltage for the turn-off circuit is supplied from the feedback winding of the transformer to eliminate the need for a power source used for only the turn-off circuit, thus resulting in low cost.

DETAILED DESCRIPTION OF THE PREFERRED EMBODIMENTS

A power source circuit according to an embodiment of the present invention will be described with reference to FIG. 2.

Figure 2:
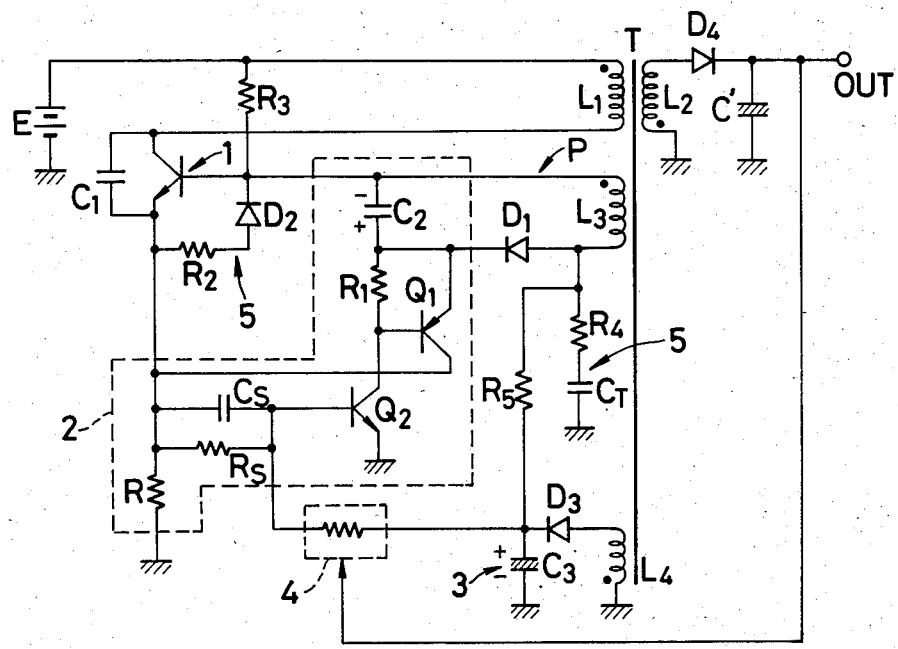
FIG. 2 is a circuit diagram showing the overall arrangement of a power source circuit according to an embodiment of the present invention.

Referring to FIG. 2, reference symbol T denotes a transformer which has a primary winding $L_1$, a secondary winding $L_2$, a feedback winding $L_3$ and an auxiliary winding $L_4$. Reference numeral 1 denotes a bipolar transistor for intermittently supplying a current to the primary winding $L_1$ of the transformer T. The collector of the bipolar transistor 1 is connected to a power source E through the primary winding $L_1$, and the emitter of the transistor 1 is grounded through a resistor R. Reference symbol $C_1$ denotes a capacitor connected between the collector and emitter of the bipolar transistor 1. The capacitor $C_1$ is arranged to reduce pulse noise. Reference numeral 2 denotes a turn-off circuit which supplies a reverse bias voltage to the base of the bipolar transistor 1 when an emitter voltage thereof increases. Reference numeral 3 denotes a voltage correction circuit. The circuit 3 is arranged to stabilize an output voltage at an output terminal OUT in a manner to be described later. Reference numeral 4 denotes a threshold regulating circuit; and 5, a period determining circuit.

The turn-off circuit 2 comprises a transistor $Q_2$ for detecting an emitter voltage at the transistor 1, a transistor $Q_1$ which is turned on/off under the control of the transistor $Q_2$, a resistor R connected between the emitter of the bipolar transistor 1 and ground, a capacitor Cs and a resistor Rs which are inserted between the base of the transistor $Q_2$ and the emitter of the bipolar transistor 1, a capacitor $C_2$ one end of which is connected to the emitter of the transistor $Q_1$ and the other end of which is connected to the base of the bipolar transistor 1, and a resistor $R_1$ connected between the base and emitter of the transistor $Q_1$. A power source voltage P is supplied from the feedback winding $L_3$ through the diode $D_1$.

The capacitor CS is arranged to increase a frequency of positive feedback. The resistor Rs is arranged to set a positive feedback gain.

Figure 1:
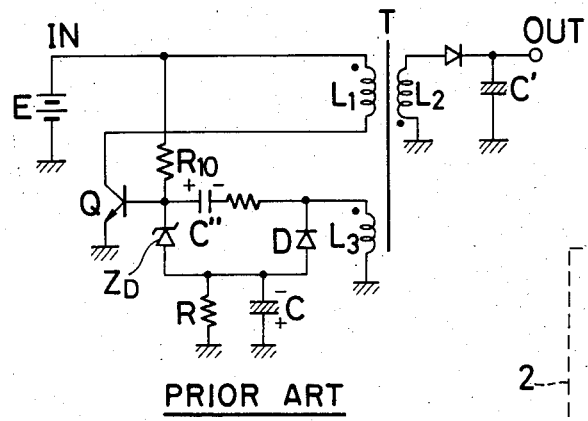
FIG. 1 is a circuit diagram of a conventional power source circuit.

The voltage correction circuit 3 comprises the auxiliary winding $L_4$, a diode $D_3$ and a capacitor $C_3$. One end of the auxiliary winding $L_4$ is grounded, and the other end thereof is connected to the anode of the diode $D_3$. The capacitor $C_3$ is connected between the cathode of the diode $D_3$ and ground. The anode of the diode $D_1$ and the cathode of the diode $D_3$ are coupled through a feedback resistor $R_5$. The capacitor $C_3$ is charged by a counter electromotive force with the polarities illustrated in FIG. 1 through the diode $D_3$. This counter electromotive force is generated by the auxiliary winding $L_4$. The charge voltage of the capacitor $C_3$ is used to control the operation of the transistor $Q_2$ in accordance with an impedance of the threshold regulating circuit 4.

The threshold regulating circuit 4 adjusts the level at which the transistor $Q_2$ of the turn-on circuit 2 is to be turned on. The threshold regulating circuit 4 is arranged such that a light-emitting element of a photocoupler is driven in response to an output voltage at the output terminal OUT so as to change an impedance of a light-receiving element connected between the base of the transistor $Q_2$ in the turn-on circuit 2 and the cathode of the diode $D_3$ in the voltage correction circuit 3. In other words, the threshold of the turn-on circuit 2 is regulated by feeding back the output voltage, thereby stabilizing the output voltage. The period determining circuit 5 controls the switching period of the bipolar transistor 1. The period determining circuit 5 comprises a diode $D_2$, a resistor $R_2$, a timing capacitor $C_T$ and a resistor $R_4$. The diode $D_2$ is connected in series with the resistor $R_2$. This series circuit is connected between the base and the emitter of the bipolar transistor 1 so as to protect this transistor. A resistor $R_4$ is connected in series with the timing capacitor $C_T$, and this series circuit is connected between the anode of the diode $D_1$ and ground. The timing capacitor $C_T$ is charged through the bipolar transistor 1 such that a ground side of the capacitor $C_T$ becomes positive when the bipolar transistor 1 is turned on. When the bipolar transistor 1 is reverse biased and is turned off, the capacitor $C_T$ is discharged. This charge/discharge operation of the capacitor $C_T$ is repeated to determine the switching period of transistor.

It should be noted that a starting resistor $R_3$ is connected between the base of the bipolar transistor 1 and the power source E.

The operation of the power source circuit having the arrangement described above will be described hereinafter. A current from the power source E flows in the base of the bipolar transistor 1 through the resistor $R_3$. The current further flows through the feedback winding $L_3$, the resistor $R_4$ and the timing capacitor $C_T$ to charge the timing capacitor $C_T$. The bipolar transistor 1 is turned on in response to the base current to energize the primary winding $L_1$ of the transformer T. A voltage is induced in the feedback winding $L_3$. This voltage is applied to the base of the bipolar transistor to increase the base voltage, thereby rapidly turning on the bipolar transistor 1.

The timing capacitor $C_T$ is charged with a current flowing through the feedback winding $L_3$, the base of the bipolar transistor 1, the emitter thereof, the resistor R and ground in the order named. In this case, the ground side of the timing capacitor $C_T$ is positively charged. A voltage corresponding to a current amplification factor is generated at the emitter of the bipolar transistor 1, and a potential difference across the resistor R is increased. The transistor $Q_2$ is then turned on. The impedance of the threshold regulating circuit 4 contributes to the ON operation of the transistor $Q_2$. At the same time, the transistor $Q_1$ is turned on, so that the carriers are rapidly extracted from the base of the bipolar transistor 1 due to the carriers charged by the capacitor $C_2$. As a result, the bipolar transistor 1 is instantaneously turned off. A current flowing through the primary winding $L_1$ is rapidly decreased to generate a counter voltage at the feedback winding $L_3$. The counter voltage charges the capacitor $C_2$ through the diode $D_1$. At the same time, the timing capacitor $C_T$ is discharged through ground, the resistor R, the resistor $R_2$, the diode $D_2$ and the feedback winding $L_3$ in the order named. The bipolar transistor 1 is reverse biased to neutralize the base carriers. A current flows through the secondary winding $L_2$ when the current flowing through the primary winding $L_1$ is rapidly decreased, so that the current is rectified and smoothed by the diode $D_4$ and the capacitor C'.

Thereafter, a base current flows in the bipolar transistor 1 through the resistor $R_3$ to turn on the transistor 1. A current flows through the primary winding $L_1$. The above operation is then repeated.

The operation of the voltage correction circuit 3 will be described. This circuit serves to compensate for a voltage drop of the power source E or a voltage drop at the output terminal OUT caused by overloading. When a voltage drop occurs due to an overload, a current flowing through the auxiliary winding $L_4$ is increased, and a voltage across the capacitor $C_3$ is also increased. When the voltage across the capacitor $C_3$ is increased, a current flowing in the turn-off circuit 2 is increased by the threshold regulating circuit 4, and an ON time of the transistor $Q_2$ is shortened. As a result, the discharge time of the capacitor $C_2$ and hence the switching period of the bipolar transistor 1 are shortened. Energy supplied to the primary winding $L_1$ is increased so as to increase the output voltage. In other words, the output voltage can be stabilized.

As has been described in detail, the bipolar transistor 1 repeats high-speed switching. The carriers left in the base of the bipolar transistor are rapidly extracted by the capacitor $C_2$, and the repeated frequency can be several times that of the conventional power source circuit.

Figure 3:
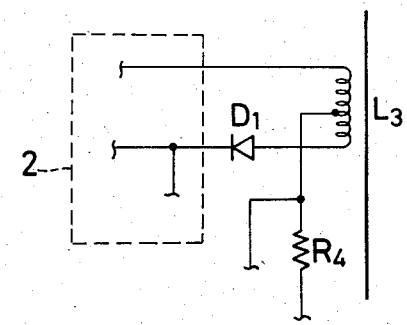
FIG. 3 is a circuit diagram showing part of a power source circuit according to another embodiment of the present invention.

The power source voltage P for the turn-off circuit 2 is supplied from the feedback winding $L_3$. In this case, the feedback winding $L_3$ may comprise a tapped feedback winding as shown in FIG. 3 so as to obtain a higher voltage than that of the arrangement shown in FIG. 2. The transformer T preferably comprises a magnetic circuit with a gap to avoid magnetic saturation.

According to the power source circuit of the present invention, the switching frequency can be greatly increased so as to allow the size of the transformer and the capacitor to be decreased, thereby providing a compact and low-cost power source circuit. The degradation of efficiency which is caused by an RF arrangement can be prevented. In the above embodiment, the bipolar switching transistor can be instantaneously switched to improve efficiency from 70% to 80%. In addition, heat generated from the power source circuit can also be decreased, and the switching period can be variably adjusted. Furthermore, since the load response speed can be increased and the output voltage can be stabilized, the power source circuit can be suitably used as a compact power source circuit of a computer.

What is claimed is:

1. A switching power source circuit for intermittently switching a current at a primary winding of a transformer in accordance with repeated switching of a first bipolar transistor having its collector connected to said primary winding and its emitter connected to ground through a first resistor, and having a first diode and first capacitor connected to a secondary winding so as to rectify and smooth a voltage induced at said secondary winding of transformer, obtaining an output voltage therefrom, comprising:

a period determining circuit having a timing resistor and a series timing capacitor and connected between a first end of a feedback winding of said transformer and ground, the other end of said feedback winding being connected to the base of said first bipolar transistor, said timing capacitor being charged with a polarity so as to reverse bias said first bipolar transistor when said first bipolar transistor is turned on and thereafter being discharged to turn off said first bipolar transistor by means of a charge voltage of said timing capacitor;

a turn-off circuit having a second capacitor with one end connected to receive a voltage induced by said feedback winding through a second diode connected to said first end of said feedback winding, the other end of said second capacitor being connected to the base of said first bipolar transistor, and for applying the second capacitor charge voltage as a reverse bias voltage directly between the base and an emitter of said first bipolar transistor through a second transistor having its collector connected to the emitter of said first transistor and its emitter connected to said one end of said second capacitor, its base being connected to sense a voltage at the collector of a third transistor having a load resistor connected to said one end of said second capacitor, the emitter of said third transistor being connected to ground and the base thereof being connected to the ungrounded end of said first resistor connected between the emitter of the first bipolar transistor and ground through a second resistor and a capacitor in parallel therewith to sense when the voltage across the first resistor reaches a predetermined level wherein said second resistor is chosen to set positive feedback gain and said parallel capacitor increases the frequency of positive feedback; and a voltage correction circuit having a third capacitor connected to receive a signal from an auxiliary winding through a third diode and applying the signal received by said third capacitor to said first end of said feedback winding through a third resistor and applying said signal received by said third capacitor to said base of said third transistor through a variable impedance device having an impedance adjusted according the output voltage to control said predetermined level.

2. A switching power source circuit for intermittently switching a current at a primary winding of a transformer in accordance with repeated switching of a first bipolar transistor having its collector connected to said primary winding and its emitter connected to ground through a first resistor, and having a first diode and first capacitor connected to a secondary winding so as to rectify and smooth a voltage induced at said secondary winding of said transformer, obtaining an output voltage therefrom, comprising:

a period determining circuit having a timing resistor and a series timing capacitor and connected between a first end of a feedback winding of said transformer and ground, the other end of said feedback winding being connected to the base of said first bipolar transistor, said timing capacitor being charged with a polarity so as to reverse bias said first bipolar transistor when said first bipolar transistor is turned on and thereafter being discharged to turn off said first bipolar transistor by means of a charge voltage of said timing capacitor;

a turn-off circuit having a second capacitor connected to receive a voltage induced by said feedback winding through a second diode connected to said first end of said feedback winding, the other end of said second capacitor being connected to the base of said first bipolar transistor, and for applying the second capacitor charge voltage as a reverse bias voltage directly between the base and an emitter of said first bipolar transistor through a second transistor having its collector connected to the emitter of said first transistor and its emitter connected to said one end of said second capacitor, its base being connected to sense a voltage at the collector of a third transistor having a load resistor connected to said one end of said second capacitor, the emitter of said third transistor being connected to ground and the base thereof being connected to the ungrounded end of said first resistor connected between the emitter of the first bipolar transistor and ground through a second resistor and a capacitor in parallel therewith to sense when the voltage across the frist resistor reaches a predetermined level wherein said second resistor is chosen to set positive feedback gain and said parallel capacitor increases the frequency of positive feedback; and a voltage correction circuit for detecting flyback energy by connecting an auxiliary winding of said transformer to said period determining circuit and to said third transistor to adjust the threshold of said turn-off circuit and the charge voltage of said timing capacitor, and changing ON and OFF times of said first bipolar transistor.

3. A circuit according to claim 1, wherein a power source voltage for said turn-off circuit is supplied from said feedback winding of said transformer.

4. A circuit according to claim 2, wherein a power source voltage for said turn-off circuit is supplied from said feedback winding of said transformer.

* * * * *